US012703386B2

(12) United States Patent
Weigand et al.

(10) Patent No.: US 12,703,386 B2
(45) Date of Patent: Aug. 11, 2026

(54) METHOD AND PROCESSOR CIRCUIT FOR CONSUMPTION OPTIMIZATION OF FULLY AUTOMATED OR PARTIALLY AUTOMATED DRIVING MANEUVERS OF A MOTOR VEHICLE, MOTOR VEHICLE EQUIPPED ACCORDINGLY, AND SYSTEM

(71) Applicant: CARIAD SE, Wolfsburg (DE)

(72) Inventors: Christoph Weigand, Wolfsburg (DE); Kevin Beck, Wolfsburg (DE)

(73) Assignee: CARIAD SE, Wolfsburg (DE)

(*) Notice: Subject to any disclaimer, the term of this patent is extended or adjusted under 35 U.S.C. 154(b) by 62 days.

(21) Appl. No.: 18/722,531

(22) PCT Filed: Sep. 7, 2022

(86) PCT No.: PCT/EP2022/074829

§ 371 (c)(1), (2) Date: Jun. 20, 2024

(87) PCT Pub. No.: WO2023/117161

PCT Pub. Date: Jun. 29, 2023

(65) Prior Publication Data

US 2025/0065909 A1 Feb. 27, 2025

(30) Foreign Application Priority Data

Dec. 21, 2021 (DE) ........................ 102021134155.8

(51) Int. Cl.

*B60W 60/00* (2020.01)
*B60W 30/14* (2006.01)

(Continued)

(52) U.S. Cl.

CPC ........ *B60W 60/001* (2020.02); *B60W 30/146* (2013.01); *B60W 50/06* (2013.01); *B60W 50/14* (2013.01); *B60W 2556/45* (2020.02)

(58) Field of Classification Search

CPC .. B60W 60/001; B60W 30/146; B60W 50/06; B60W 50/14; B60W 2556/45;

(Continued)

(56) References Cited

U.S. PATENT DOCUMENTS 11,590,974 B2 2/2023 Limbacher et al.
11,661,067 B2 5/2023 Schiegg et al.

(Continued)

FOREIGN PATENT DOCUMENTS

DE 10141805 A1 5/2002
DE 102008005328 A1 7/2008

(Continued)

*Primary Examiner* — Sze-Hon Kong

(74) *Attorney, Agent, or Firm* — Seed Intellectual Property Law Group LLP

(57) ABSTRACT

A method for consumption optimization of fully automated or partially automated driving maneuvers of a motor vehicle is provided. The disclosure provides that a self-learning system is operated by a processor circuit, and by way of which driving situation data is received, and the driving situation data is provided to a model of machine learning as input variables and the model is used to generate a specification signal for the at least one driver assistance system from the input variables, and consumption data of a consumption measurement is received and the consumption data is mapped on an evaluation signal by way of an evaluation function, and a training algorithm that trains the model is signaled by way of the evaluation signal, if, for the respective driving situation, the used specification is to be retained or enhanced or avoided.

12 Claims, 2 Drawing Sheets

(51) Int. Cl.
*B60W 50/06* (2006.01)
*B60W 50/14* (2020.01)

(58) Field of Classification Search
CPC ......... B60W 30/18072; B60W 30/182; B60W 60/0023; B60W 30/14; B60W 2050/0028; B60W 2530/10; B60W 2552/15; B60W 2554/406; B60W 2555/20; B60W 2556/50; B60W 2720/10; B60W 2720/14; B60W 2754/30; G06N 3/092; G06N 5/01; G06N 20/00
See application file for complete search history.

(56) References Cited

U.S. PATENT DOCUMENTS

| | | | | |
|---|---|---|---|---|
| 2016/0352764 | A1* | 12/2016 | Mermoud | H04L 63/1425 |
| 2017/0166222 | A1* | 6/2017 | James | B60W 40/09 |
| 2019/0135303 | A1* | 5/2019 | Kim | B60W 50/0098 |
| 2019/0291728 | A1* | 9/2019 | Shalev-Shwartz | B60W 30/09 |
| 2020/0174490 | A1* | 6/2020 | Ogale | G05D 1/0221 |
| 2020/0346665 | A1* | 11/2020 | Araújo | A61B 5/163 |
| 2021/0070286 | A1* | 3/2021 | Green | G06V 10/25 |
| 2021/0326703 | A1* | 10/2021 | Zimmer | G06N 3/0499 |
| 2021/0380108 | A1* | 12/2021 | Iihoshi | B60W 50/0097 |
| 2022/0114475 | A1* | 4/2022 | Zhu | G16H 50/20 |
| 2022/0153298 | A1* | 5/2022 | Wang | G06N 3/08 |
| 2022/0242455 | A1* | 8/2022 | Fu | B60W 60/0053 |
| 2022/0274585 | A1* | 9/2022 | Yamaguchi | B60W 30/06 |
| 2023/0144796 | A1* | 5/2023 | DePoy | G06N 20/00 706/12 |
| 2023/0222332 | A1* | 7/2023 | Mahendran | G06N 3/045 706/25 |
| 2024/0075927 | A1 | 3/2024 | Seccamonte et al. | |
| 2024/0092340 | A1 | 3/2024 | Hofstetter et al. | |
| 2024/0249199 | A1* | 7/2024 | Jeong | G06N 3/0464 |
| 2024/0395075 | A1* | 11/2024 | Ol | G06N 20/00 |

FOREIGN PATENT DOCUMENTS

| | | | |
|---|---|---|---|
| DE | 102016214822 | A1 | 2/2018 |
| DE | 102020114306 | A1 | 12/2020 |
| DE | 102019215530 | A1 | 4/2021 |
| EP | 3725633 | A1 | 10/2020 |

* cited by examiner

11
Server Device
12
13
Actuator
20
Consumption Measurement
40
Driver Assistance
18
(Specification) 24
22
26
27
Model
Self-Learning System
42 (Evaluation Function)
43 (Evaluation Signal)
RL
44
Environmental Perception
41
28
29
EP
29
Sensor Data Fusion
39'
39 (Data)
a
b
c
d
e
f
g
h
h

METHOD AND PROCESSOR CIRCUIT FOR CONSUMPTION OPTIMIZATION OF FULLY AUTOMATED OR PARTIALLY AUTOMATED DRIVING MANEUVERS OF A MOTOR VEHICLE, MOTOR VEHICLE EQUIPPED ACCORDINGLY, AND SYSTEM

BACKGROUND

Technical Field

The disclosure relates a method and a processor circuit for consumption optimization of fully automated or partially automated driving maneuvers of a motor vehicle. The driving maneuvers are executed by way of at least one driver assistance system, which is signaled a specification for the execution of the driving maneuver in each case, e.g., a specification concerning the maximum driving speed to be set. The goal is to determine in an automated manner which specification is optimal in terms of consumption for a current driving situation. The disclosure also relates to a motor vehicle equipped accordingly, and a system that can coordinate several such motor vehicles.

Description of the Related Art

Driver assistance systems, such as, e.g., Adaptive Cruise Control (ACC), tracking, emergency braking, are nowadays already available in a motor vehicle and enable partially automated vehicle driving (either the longitudinal guidance or the transverse guidance is done in an automated manner). Future driver assistance systems are designed for various closed areas of application, such as, e.g., highways, so that they can execute driving maneuvers in a fully automated manner (i.e., level 3 according to standard SAE J3016). Starting with level 3, it will be possible to drive through sections in a fully automated manner. Similar to current driver assistance systems, starting at level 3, the distance and the speed are held, the track is held, and the environment is monitored to be able react to situations appropriately.

However, current driver assistance systems, such as ACC, are only optimized not to exceed the set top speed (manually or via map information/identification of traffic signs by means of image processing) and not to fall below the set distance to the vehicle driving ahead.

If another vehicle goes into the lane behind the vehicle driving ahead, the driver assistance system immediately applies the brake to reestablish the specified distance. If the vehicle driving ahead accelerates, the driver assistance system also accelerates. Simply retaining set limits of the driver assistance system can result in a higher consumption of energy or fuel compared to manual forward-looking driving.

DE 101 41 805 A1 discloses, that provision can be made for a display of a motor vehicle, to compare the current driving speed with different reference speeds for "energy saving driving" and "safe drive" and to signal a driver of the motor vehicle the driving style to which their current driving speed corresponds and the driving speed recommended. An automated intervention in the vehicle driving can be done also, in order to enforce a particular reference speed. The values that have to be used as the basis for the reference speeds must be calculated in advance and stored in the system. This means only a limited number of possible driving situations can be taken into account in advance.

DE 10 2016 214 822 A1 discloses to alert a driver about a driving speed to strive for by calculating a target maximum speed based on the maximum permissible driving speed. A scaling factor to be used for this purpose or a value to be subtracted can be determined as a function of the state of charge of an energy store of the motor vehicle. This results in a simple, but relative inflexible selection of an optimal speed value.

DE 10 2008 005 328 A1 discloses to calculate an indication on an energy consumption minimizing driving style or route by way of an extensive calculation based on a current vehicle condition, for example the loading, tires, motorization and transmission of the motor vehicle. However, developing such a calculation procedure is complex and may not take into account all driving situations.

BRIEF SUMMARY

It is the object of the disclosure to determine, for the operation of at least one driver assistance system, that executes driving maneuvers in a fully automated or partially automated manner in a motor vehicle, suitable specifications to be adhered to, that optimize, that is to say in particular minimize, the driving operation of the motor vehicle with respect to a consumption or an emission.

As one solution, the disclosure comprises a method for consumption optimization of fully automated or partially automated driving maneuvers of a motor vehicle. The method is based on the fact that the driving maneuvers are executed by at least one driver assistance system in a fully automated or partially automated manner. At least one driver assistance system is provided, i.e., in particular an automatic distance control (ACC) and/or one of the other driver assistance systems described previously, just to name a few examples. Each of such driver assistance systems usually has a control input or a control interface, by way of which such driver assistance system can receive a specification, for example concerning the maximum driving speed, or the driving speed not to be exceeded, to be set and/or a distance value, just to name a few examples. However, especially, a driver assistance system also has internal specifications or restrictions which a driver assistance system itself would not violate or ignore even if it were to receive another specification. For example, a driver assistance system can ignore or reject an external specification concerning a driving speed to be traveled at or to be set for speed control, if, within of driver assistance system, there is the internal specification or information (for example, from map data of an environment of the motor vehicle) that a speed limit or a maximum allowed top speed is smaller than the external specification.

In order to determine specifications for a consumption optimization in those circumstances the disclosure comprises, that a self-learning system is operated by a processor circuit. The processor circuit can be provided in the motor vehicle itself, for example as a control device or composite of several control devices or as a central computing device, or the processor circuit can be implemented external to the motor vehicle, for example, in a so-called backend server. The processor circuit can be a distributed circuit that is provided partially in the motor vehicle and partially in a backend server external to the vehicle provided. The "self-learning system" mentioned herein can be implemented through software or program code of the processor circuit.

The self-learning system executes the following steps:

driving situation data are received, which describe a respective driving situation, in which the respective driving maneuver is executed currently or most likely or according to plan, and the driving situation data are provided to a machine learning model as input variables and said model is used to generate a specification signal for the at least one driver assistance system from the input variables, wherein the specification signal specifies a specification to be adhered to during the respective driving maneuver (that is to say an external specification as defined above), and consumption data of a consumption measurement is received which indicate an energy requirement and/or performance requirement and/or fuel requirement incurred, and/or an emission of at least one "exposure" (e.g., carbon dioxide, noise) when executing the respective driving maneuver, and the consumption data are combined in an evaluation signal by way of an evaluation function, and a training algorithm training said model is signaled by way of the evaluation signal, if, for the respective driving situation, the used specification is to be retained or enhanced or avoided. The training algorithm can then retrain or adjust the model accordingly, so that in the future in the same driving situation and/or same driving maneuver a mapping behavior of model results, that corresponds to the evaluation signal.

For the current driving situation, a specification for the at least one driver assistance system is generated by way of the model and the resulting consumption data are measured or determined. The type of specification that can be set or parameterized in a given driver assistance system depends on the type of driver assistance system and can be ascertained by a skilled person in the art in a manner known per se, e.g., based on the description of the control interface of the driver assistance system. The unit "driving maneuver" mentioned herein can, for example, refer to a certain section of the route (driving maneuver for traveling the section of the route, e. g. a preceding driving distance of a predetermined length, e. g. in the range of 5 km to 200 km) or, for example, to a single steering maneuver or acceleration maneuver or braking maneuver or, for example, to a combination of several such guidance steps (steering, accelerating, braking), as may be necessary for an overtaking maneuver, for example. A driving maneuver may indicate a predetermined period of time while traveling, e. g. travel over the last or the next 10 min or generally during a predetermined time interval. It should be noted, that the machine learning model doesn't have to know the executed or planned driving maneuvers for generating the specification signal. Alternatively, provision can be made, that the at least one driver assistance system signals the self-learning system by way of maneuver data, which driving maneuver (e.g., overtaking or distance control) is executed currently or will be executed next, and that this maneuver data from the machine learning model are included in generating the specification signal. Then, the evaluation signal is used to evaluate the respective combination of driving maneuver and driving situation. In connection with a driving maneuver that is associated with a predetermined period of time, this period of time can be identified by way of a time tracking (clock) (e.g., the previous 10 min).

Alternatively or in addition to the requirements, the emission of an exposure determined herein can be, or defined as an exposure, for example, to carbon dioxide (carbon dioxide emission) and/or noise (noise level). The evaluation function can be used to "interpret" the consumption data," that is to say it can be determined, if the consumption data represents high consumption or low consumption in relation to the driving maneuver at a given driving situation. Here, a person skilled in the art can establish evaluation rules or value intervals for categorizing or classifying the consumption data as "low consumption" or "high consumption." This can also be done in a dynamic manner as a comparison with previous, historical consumption data for the same driving situation (e.g., "less than the previous time" or "negative trend during the driving maneuver"). The driving situation can be a combination of a number of parameters to be determined by a skilled person based on the "driving situation data," such as, for example, a current loading of the motor vehicle and/or a current weather, just to name a few examples, which will be explained in more detail below. A current driving situation, as described by the driving situation data, can be a combination of vehicle condition (e.g., loading) and/or driving environment (e.g., travelling in the mountains) and/or traffic environment (e.g., traffic jam).

Advantageously, the disclosure provides that a consumption-optimized specification in relation to the requirements in terms of energy/power/fuel and/or the emission can be determined by way of the machine learning model in an automated manner during a driving operation or while a motor vehicle is in use for a plurality of different driving situations and for different driving maneuvers to be executed during said driving situations (e.g., overtaking maneuver). Consequently, a respective specification need not be determined in advance, for example based on extensive calculations and/or simulations. In addition, new driving situations can result in further specifications or appropriate or consumption-optimized specifications can be determined for new driving situations.

The disclosure also includes refinements or further developments resulting in additional advantages.

A further development comprises, that additionally implementation data are received, which indicates, if the specification has been rejected by the at least one driver assistance system, and a rejected specification is signaled as to be avoided in the future by way of the evaluation signal. Thus, the implementation data signals the self-learning system, if his specification was not accepted or not complied with. As described above, this can be brought about or controlled by at least one "internal specification" in the respective driver assistance system, which the specification of the self-learning systems violated or with which it is incompatible. Thus, the model is also trained or the model learns, which internal specifications or boundaries or restrictions can be found in the respective driver assistance system. Consequently, the model can also be trained or learns, which safeguarding and/or limits are advantageous for its specification.

A further development comprises, that at least a portion of the driving situation data are generated by way of an environmental perception of the motor vehicle and describes road users identified in an environment of the motor vehicle, i.e., the traffic situation. An "environmental perception" can be implemented in a motor vehicle by way of at least one control device and map or indicate identified road users in a so-called environment map, for example. This is to say that the respective relative position of the road users can be determined and saved or signaled in the environment map and/or in a digital environment description, for example a mathematical diagram, based on at least one sensor of the motor vehicle, for example radar and/or lidar and/or camera, and/or based on at least one receiver for a vehicle-to-vehicle communication. This environmental perception can then also be taken into account by the model in form of the driving situation data or as part of the driving situation data. Thus, the model can also take into account an assignment of a respective traffic situation or a relative position of at least one road user and/or the relative speed of at least one road user with respect to the motor vehicle when generating the specification signal. Consequently, in particular in combination with the already described identification of a rejection of a specification, it can be identified or learned, if a driver assistance system, for example to avoid a dangerous driving maneuver, rejects a specification in a traffic situation signaled by the environmental perception based on relative positions and/or speeds of at least one road user, because, e.g., the specification provided for a distance was too small. This is then by the model through a combination of the environmental perception and the identification of the rejection of a specification, so that in the future for example critical and/or risky driving maneuver can be avoided already by the model. Hereby, in particular, in the case of several driver assistance systems, the knowledge or the information about a rejected specification at certain constellations of surrounding road users or at least one road user in the surroundings can also be transferred to a specification for at least one other driver assistance system, so that a coordination of several driver assistance systems for avoiding undesirable driving maneuvers in the presence of at least one other road user can take place by way of the model.

A further development comprises, that at least one the following specifications is signaled by way of the specification signal:

a sailing operation with speed limit ahead, a reduction in driving speed below a speed limit and/or below a set point of an automatic cruise control, ACC.

These are merely examples proven to be particularly advantageous. Since in this case a reduction of the driving speed to 0 could also be a possible specification, it is possible, in particular in connection with a rejected specification, as described, and/or in combination with the environmental perception (e.g., detecting a road user behind), to ensure that such a specification is avoided, because an unwanted driving situation, for example congestion of following traffic, is avoided.

A further development comprises that the driving situation data describes at least one the following situations:

a vehicle loading, a traffic volume, a route, a maximum available travel time, a current weather, a current temperature.

A vehicle loading can determined, for example, from the compression travel known per se, as can be determined at at least one damper of a chassis of the motor vehicle. The traffic volume can be determined, for example, from traffic data available on an internet server. The route can be retrieved or read-out for example from of a navigation system of the motor vehicle and/or a mobile terminal of a user of the motor vehicle. The maximum available travel time can be calculated, for example, from calendar dates of a vehicle user, if the motor vehicle is on the away to a meeting point or location, where at a predetermined date a meeting is supposed to take place. The current weather can be determined by way of a meteorological service and/or for example by way of a rain sensor and/or a camera. The current temperature can also be determined by way of a meteorological service and/or by way of a temperature sensor of the motor vehicle and/or a mobile terminal of the motor vehicle. Such driving situation data has proven to be informative with respect to the assessment and/or control or selection of specifications for driving maneuvers to achieve an optimization of consumption or a minimization of consumption.

A further development comprises, that the at least one driver assistance system is controlled or a setting recommendation is issued to a user of the motor vehicle by way of the specification signal. In other words, the driver assistance system can be controlled or set directly by way of the self-learning system (that is to say, without user intervention), and/or a recommendation or indication on the use or setting for the at least one driver assistance system can be provided to a user of the motor vehicle.

What follows is a description of solutions as to how a change or a training or an adjustment of the machine learning model can be carried out by way of the evaluation signal to the effect that specifications can be adjusted by way of the model in such a way that a reduction in consumption is achieved.

A further development comprises, that the evaluation signal indicates, if and/or to what extent the requirement for the driving maneuver in comparison to a predetermined reference consumption has an improving or deteriorating effect by the specification of the specification signal, and/or if the requirement is within a predetermined value interval. This means, the evaluation signal can signal a comparison to a reference consumption and indicate, if the consumption or requirement or the emission with respect to the reference consumption is reduced or greater or the same, and/or to which extent, that is to quantify the reduction or increase that has taken place. Here, the evaluation signal can signal a value or a trend (gradient or direction). Additionally or alternatively, the evaluation can take place to the effect that value intervals for the consumption data are specified and the value interval is determined, in which the consumption can be found. Here, each value interval can be assigned an evaluation label or evaluation information, for example "economical consumption," "high consumption," "consumption too high," "optimal consumption," just to name a few examples. As a result, the consumption data can be mapped on a respective signal value of the evaluation signal.

A further development comprises, that a reinforcement learning or an "exploration versus exploitation" algorithm is used as the training algorithm. When using reinforcement learning it is not necessary to provide so-called labeled training data, that is to say, have a user make an evaluation of the consumption data. Advantageously, in doing so, the system can actually be configured to be self-learning by way of the model.

By way of the described algorithm it is also possible to achieve different strategies when "trying out" or tentatively changing the specification, in order to determine, if an improved or reduced requirement and/or a decreased emission can be obtained by a different specification.

A further development comprises, that the model is initialized by way of an initial standard model, which provides the same specification for driving maneuvers of different maneuver types. Thus, by initial or early operating a standard model, the self-learning system is ready for use right away. As a result, it can be provided or delivered from a factory. The standard model can also be downloaded from a backend server into the self-learning system via an internet connection. Based on the standard model, the specifications can be differentiated or changed in different directions or trends for the different maneuver types. Maneuver types include, for example: driving along curves, accelerating, mountain driving, overtaking maneuvers, urban driving, highway driving, just to name a few examples.

A further development comprises, that model data of the model which describes a current mapping behavior of the model, are sent to a central server device external to the vehicle, and combined model data are received from the server device, which has been generated by the server device by combining the model data and further model data of at least one further motor vehicle, and the model is updated by way of a combined model data. An artificial neural network and/or a so-called decision tree can be used as machine learning model, for example. A current learning state of such model is described by model data. The model data translates into the mapping behavior, that is to say the mapping of the relevant driving situation data on the value of the specification signal. In an artificial neural network, model data include, for example, the network configuration (number the network layers and/or neurons per layer) and the current weighting values determined or set. The central server device can be the described backend server, for example, where then the model data of several models can be combined or fused, so that the learning outcome or training outcome of a model in one motor will also be available or usable in the model a another motor vehicle. The result is the effect of the so-called swarm intelligence, from which the processor circuits of several motor vehicles can benefit advantageously.

As another solution, the disclosure comprises a processor circuit, which is designed and adapted, in a motor vehicle, to generate a specification signal for at least one driver assistance system of said motor vehicle by way of an embodiment of the method according to the disclosure. The processor circuit can be a data processing device or a processor device which is designed to execute an embodiment of the method according to the disclosure. For this purpose, the processor circuit can have at least one microprocessor and/or at least one microcontroller and/or at least one FPGA (field programmable gate array) and/or at least one DSP (digital signal processor). Furthermore, the processor circuit can have program code, which is designed, when executed by the processor device, to execute the embodiment of the method according to the disclosure. The program code can stored in a data storage of the processor circuit.

As another solution, the disclosure comprises a motor vehicle with an embodiment of the processor circuit. The motor vehicle according to the disclosure is preferably configured as a motor vehicle, in particular as passenger car or truck, or as passenger bus or motorcycle.

As another solution, the disclosure comprises a system with a server device and with at least one embodiment of the motor vehicle. Thus, the "system" described herein comprises the aggregate of a server device, that is to say, for example, the described backend server, and one, or preferably several, motor vehicles.

The disclosure comprises also combinations of features of the described embodiments. That is to say, the disclosure comprises also implementations having a combination of the feature of several of the described embodiments in each case, provided the embodiments have not been described as mutually exclusive.

BRIEF DESCRIPTION OF THE SEVERAL VIEWS OF THE DRAWINGS

Below, exemplary embodiments of the disclosure are described. In the figures.

DETAILED DESCRIPTION

The exemplary embodiments explained below are advantageous embodiments of the disclosure. In the exemplary embodiments, the described components of the embodiments represent individual features of the disclosure which are to be considered independently of each other and which refine the disclosure also independently of each other in each case. Therefore, the disclosure shall comprise combinations of the features of the embodiments other than those shown. Furthermore, the described embodiments can also be supplemented by features other than those already described.

In the figures, same reference symbols designate functionally identical elements in each case.

Figure 1:
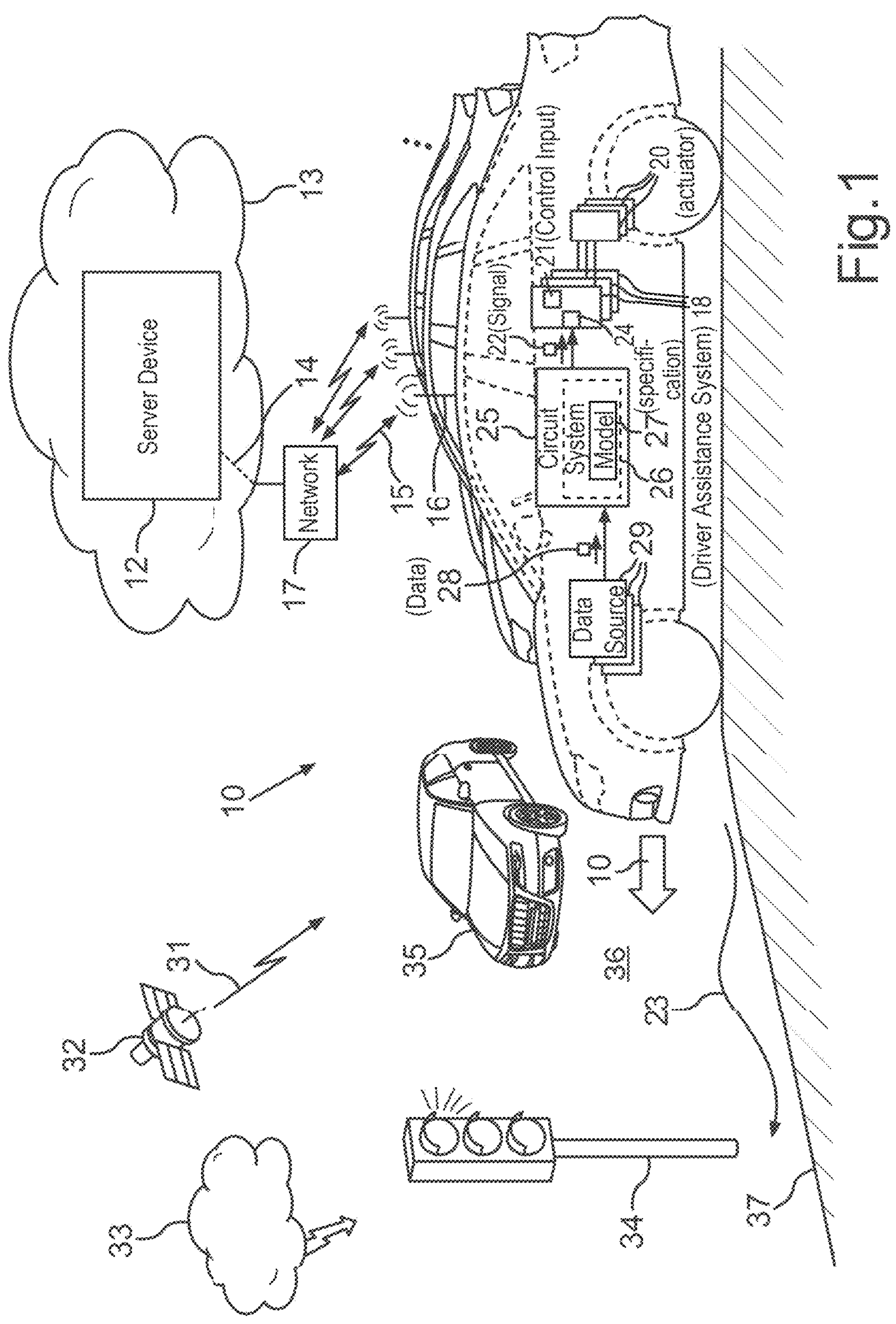
FIG. 1 shows a schematic depiction of an embodiment of the system according to the disclosure.

FIG. 1 shows a system 10 that can have several motor vehicles 11, and a server device 12 that, for example, can be provided as backend server of motor vehicles 11 in internet 13. Respective motor vehicle 11 can be a car, for example, in particular a passenger car or truck. Below, with respect to motor vehicles 11, reference is made to only one of motor vehicles 11 for further explanation of its components.

Each motor vehicle 11 can be coupled with server device 12 via a communication link 14 to exchange data. Communication link 14 can also comprise a radio connection 15, for example, which can be formed by a radio module 16 of respective motor vehicle 11, for example a cellular module or WLAN radio module (WLAN-wireless local area network), and a wireless network 17, for example a mobile network and/or a WLAN radio network.

Driver assistance system(s) 18 can be provided in respective motor vehicle 11, each of which being able to execute a partially automated or fully automated guidance of the motor vehicle (longitudinal guidance and/or transverse guidance) for a trip 19 of motor vehicle 11, by respective driver assistance system 18 controlling at least one actuator 20 of motor vehicle 11, for example an active or motorized steering and/or an engine control unit and/or a braking system of motor vehicle 11.

Respective driver assistance system 18 can have a control input or a control interface 21, by way of which driver assistance system 18 can receive a specification signal 22 which can receive a specification 24 for the driver assistance or the execution of driving maneuvers 23 during trip 19, specification 24 to be taken into account or complied with by driver assistance system 18. Such specification 24 can specify, for example, a target driving speed and/or a maximum yaw rate and/or a gear mode (sailing or towing operation or accelerating). Specification signal 22 can be generated by a processor circuit 25 which can be implemented, for example, by a control device or a group of several control devices or a central computing device of motor vehicle 11 or (not shown) by server device 12 or another backend server. Processor circuit 25 can operate a self-learning system 26 to generate specification signal 22 for respective driver assistance system 18, in which system 18 a machine learning model 27, for example an artificial neural network or a decision tree, generates or calculates the current value of specification signal 22 depending on input variables whose current value can be signaled or provided to self-learning system 26 by driving situation data 28. The driving situation data can be received from at least one data source 29, as explained further in connection with FIG. 2. Driving situation data 28 can describe, for example, a current geolocation of motor vehicle 11, as can be determined by way of a position signal 31 of a GNSS 32 (global navigation satellite system), for example a GPS (global positioning system). Additionally or alternatively, the driving situation data can describe a current weather 33. Additionally or alternatively, the driving situation data 28 can describe a current traffic situation 34, symbolized in FIG. 1 by a condition of a traffic light. The driving situation data can also describe or signal at least one other road user who is signaled in an environment 36 of motor vehicle 11 by an environmental perception (one of the possible data sources 29). Additionally or alternatively, the driving situation data can signal, for example, a topography 37, for example an up or down gradient, along which trip 19 takes place and on which driving maneuvers 23 are executed.

Figure 2:
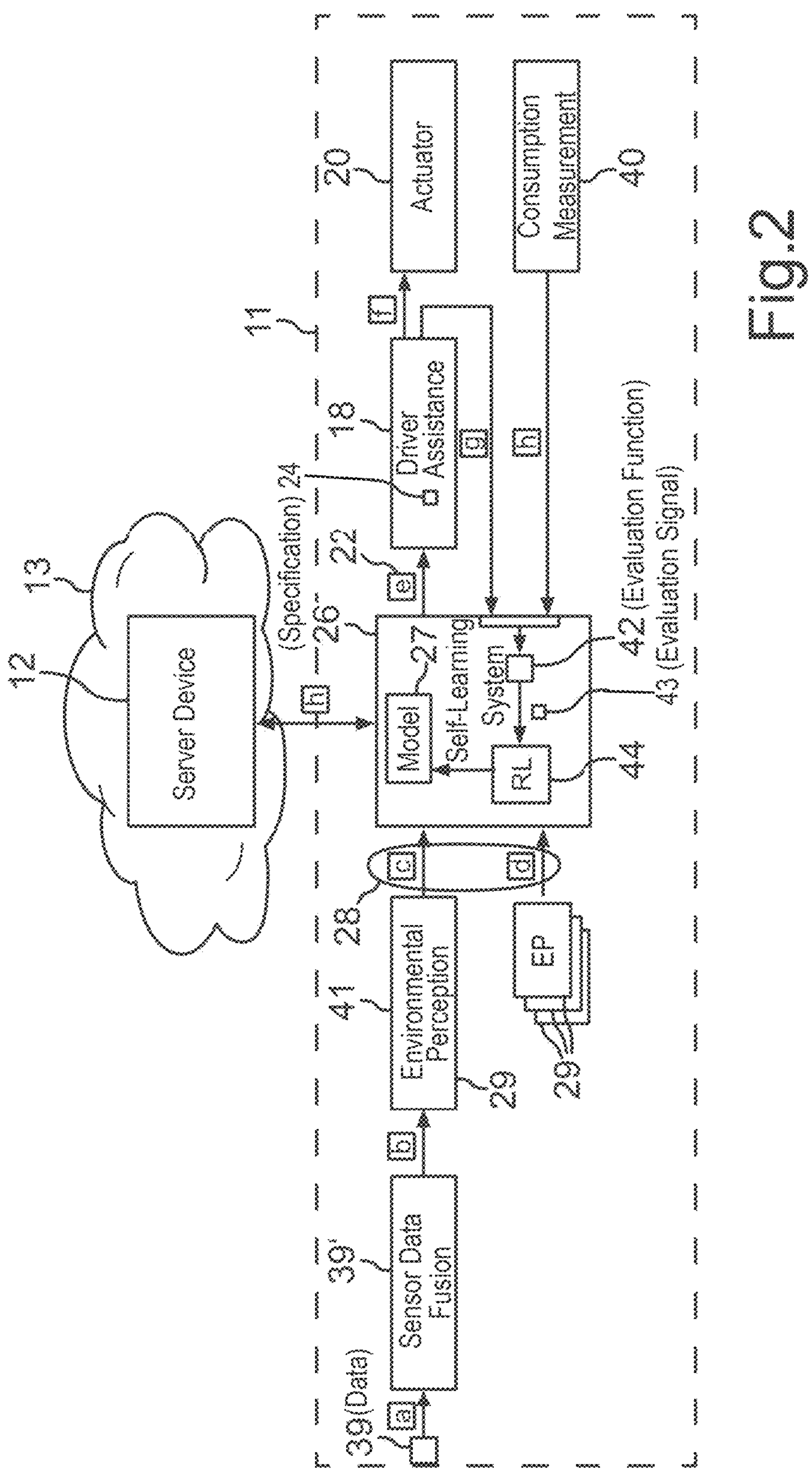
FIG. 2 shows a schematic depiction of an embodiment of the processor circuit as can be provided in motor vehicles of the system of FIG. 1.

FIG. 2 illustrates, how model 27 can be trained or adapted for mapping driving situation data 28 on specification signal 22 by self-learning system 26 so as to effect a specification 24 for a consumption optimization by specification signal 22.

FIG. 2 illustrates once more in this regard, how sensor data 39 can be generated by at least one possible data source 29 in motor vehicle 11, for example camera data and/or lidar data and/or radar data, and an environmental perception 41 can occur by way of a sensor data fusion 39' known per se, which, as part of the driving situation data, can signal or describe, for example, the at least one further road user 35. Further data sources 29 can provide further driving situation data 28 to self-learning system 26 in the manner described.

A function of, or after generating or during generating specification signal 22 for setting and replacing respective specification 24 in respective driver assistance system 18, which acts on the at least one actuator 20 as vehicle control unit, on the one hand, consumption data h from a consumption measurement 40, and, on the other, (optionally) implementation data g describing, if respective driver assistance system 18 has accepted or rejected specification 24, can be received. System 26 can be provided with maneuver data of the driving maneuver executed, for which the specification was provided as a basis, and/or which is ongoing or upcoming next.

Self-learning system 26 can evaluate an evaluation signal 43 concerning consumption data h or generally the requirement in terms of energy/power/fuel and/or the requirement of an emission (for example carbon dioxide and/or noise) for respective driving maneuver 23 with generated specification signal 22 by way of and evaluation function 42. A training algorithm 44 for model 27 can be controlled or can be informed about to benefits or the disadvantages of respective specification 24 by way of evaluation signal 43. Subsequently, by way of a training of model 27 by training algorithm 44, for example a reinforcement learning LR, regarding mapping behavior 4 of model 27 concerning mapping driving situation data 28 on specification signal 22 can be adjusted or changed or set.

The following signals a to h can affect cooperation of the components:

Sensor data fusion 39': the module "sensor data fusion" has sensor signals (a) as input. (a) can include, inter alia, camera, lidar, radar and other sensor signals. The signals are fused in the module, meaning the signals are linked in a temporally and locally uniform context. The fused data are passed on to module "environmental perception" 41 in one or several data structures.

Environmental perception 41: Module environmental perception 41 has output (b) of sensor data fusion 39' as input. The fused sensor data are used to generate an environmental perception, which includes, for example, identifying vehicles, pedestrians and other road users, estimating the movement of these objects, identification of road signs, the surrounding development, the road marking, the traffic lights, etc. Output (c) of the environmental perception can be a list of data structures, in which the characteristics of the individual objects and identified environment are described.

Self-learning system 26: Self-learning system 26 is a central component and this module predicts a consumption-optimized driving maneuver for the vehicle in the respective situation for the respective next section of the route, based on inputs (c) environmental perception 41 and (d) vehicle, environment, route and/or map information. The prediction of the best possible driving maneuver varies dependent on the inputs.

For example, if the vehicle is heavily loaded, the battery is cold, the outside temperature is low and the route ahead runs steep uphill, possibly the set ACC speed cannot be maintained, rather the kinetic energy is used to get over the hill rolling, followed by acceleration thereafter.

The output as specification signal (e) is a driving maneuver suggestion for the at least one vehicle control unit, i.e., a driver assistance system 18 and also involves the current environmental perception. This avoids, that consumption-optimized driving recommendations are affecting safety or interfere with the flow of traffic in general (e.g., slow down approaching traffic), which can be monitored by internal specifications of driver assistance system 18.

Self-learning system 26 is based on a dynamically adaptable model for prediction. This can be a machine learning model (e.g., an artificial deep neural network). The model is introduced as basic model or specific for a vehicle in the self-learning system or can be updated/exchanged on-line through interface (h) with the backend server.

Input (g) of the vehicle control unit/driver assistance system 18 is the back channel to self-learning system 26. The driving action actually executed is communicated to self-learning system via (g). This allows the driving maneuvers to be adjusted in system 26 based on other input variables.

Input (h) of the consumption measurement is the direct back channel to the self-learning system, in order to include the effectiveness of the suggested driving maneuver in the modeling.

This means that the self-learning system suggests a driving maneuver based on the environmental perception (c) and the vehicle, environment, route and map information (d). (g) and (h) are a reflection of the efficiency of the driving maneuver. Through adjustment of driving maneuver suggestions, the system can find better suggestions and possibly adjust the model on which the suggestion is based.

If the currently underlying model finds better driving maneuvers in terms of consumption, these maneuvers or the model parameters necessary for a respective prediction can be communicated to the backend via (h).

Vehicle control unit or driver assistance system 18: The vehicle control unit is not a central component and can be regarded as an abstract module. In this regard, it can be resorted to the prior art. The module is representative for all prior art control and driving systems in the vehicle. Input (e) of self-learning systems is merely one more variable for controlling driving.

Vehicle actuators 20: The vehicle actuators are not a central component and also an abstract module, which is representative for all actuators necessary for the driving. In this regard, it can be resorted to the prior art.

Consumption measurement 40: The module of consumption measurement 40 is also an abstract module and not a central component. It is representative for the necessary systems for consumption measurement in the vehicle. In this regard, it can be resorted to the prior art.

Backend server 12: The information of all vehicles which use self-learning system 26 comes together in the backend via interface (h). The backend and interface (h) can be used to update and exchange models of the self-learning systems, or to provide them initially. Information from the self-learning system about new model parameters can be checked in the backend (e.g., by creating a new model, training and validation with test data). Thereafter, the new model or the new parameters can be provided to other self-learning systems via (h).

The information or driving situation data about the traffic volume, the route, the efficiency of the vehicle at current loading, the maximum possible travel time, the weather, the temperature and more input variables can thus be merged in the self-learning system to generate and adapt the model, which predicts or specifies consumption-optimized driving maneuver for the route to be traveled on. This includes, for example, the early "rolling" at an upcoming speed limit instead of braking right before the speed limit takes effect. Furthermore a reduction in speed below the allowed or set ACC speed would be conceivable, should this, for a section of the route, increase the efficiency (possibly dependent on the loading) and thus reduce the consumption (e.g., driving slowly uphill).

The consumption-optimized prediction or control of the driving maneuver can either be displayed to the user or applied directly by the vehicle.

All consumption-optimized driving maneuver predictions involve a predictive environmental perception, so that consumption-optimized driving maneuvers avoid dangerous or interfering interactions with other road users.

The training algorithm can provide reinforcement learning (RL) which requires no ground truth, rather feedbacks (rewards) are used to provide an evaluation signal, as to how good the previously tried strategy (e.g., setting speed to 55 km/h) has functioned. The training algorithm determines to receive the best possible feedback. In this a case, the feedback could simply be the consumption value (i.e., all the smaller the consumption, all the greater the feedback and therefore all the better the strategy).

In addition, there is the "exploration vs. exploitation" tradeoff as a training algorithm in reinforcement learning. This is about finding a reasonable compromise between applying what has been learned until now (exploitation) and trying out new strategies (exploration). Frequently, RL starts with a high proportion of trying out. Over time, however, this proportion becomes smaller and smaller, and the proportion of applying what has been learned until now predominates finally.

Using swarm intelligence can be implemented as follows. There is a technical concept to merge decentralized trained models to form a global model. This approach is called federated learning:

https://ai.googleblog.com/2017/04/federated-learning-collaborative.html.

In this approach, the decentralized trained models can be collected in the server device at regular or specified time intervals, merged according to this a approach, and in turn distributed. This would ensure that all motor vehicles regularly are provided with the current knowledge of the entire fleet (=swarm intelligence).

Overall, the examples show, how a self-learning system for consumption optimization of automated and partially automated driving maneuvers can be provided.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for consumption optimization of fully automated or partially automated driving maneuvers of a motor vehicle that are executed by at least one driver assistance system in a fully automated or partially automated manner, the method being performed based on a self-learning system operated by a processor circuit, the method comprising:

receiving driving situation data that describe a driving situation in which a driving maneuver is executed;

providing the driving situation data to a model of machine learning as input variables;

generating, based on the model, a specification signal for the at least one driver assistance system from the input variables, wherein the at least one driver assistance system controls at least one actuator that controls motorized steering, an engine, or a braking system of the motor vehicle, and wherein the specification signal specifies a specification to be adhered to during the driving maneuver;

receiving consumption data of a consumption measurement that indicate an energy requirement and/or performance requirement and/or fuel requirement incurred, and/or an emission of at least one load when executing the driving maneuver;

mapping the consumption data on an evaluation signal by way of an evaluation function;

signaling a training algorithm that trains the model by way of the evaluation signal, if, for the driving situation, the specification is to be retained or enhanced or avoided;

receiving implementation data indicating that the specification has been rejected by the at least one driver assistance system; and signaling a rejected specification to be avoided by way of the evaluation signal.

2. The method according to claim 1, further comprising:

generating at least one portion of the driving situation data by way of an environmental perception of the motor vehicle, wherein the at least one portion of the driving situation data describes road users identified in an environment of the motor vehicle.

3. The method according to claim 1, further comprising:

signaling at least one specification by way of the specification signal, wherein the at least one specification specifies:

a sailing operation with speed limit ahead.

4. The method according to claim 1, wherein the driving situation data describe:

a vehicle loading, a traffic volume, a route, or a maximum available travel time.

5. The method according to claim 1, further comprising:

issuing a setting recommendation to a user of the motor vehicle by way of the specification signal.

6. The method according to claim 1, wherein the evaluation signal indicates, if and/or to what extent a requirement for the driving maneuver in comparison to a predetermined reference consumption has an improving or deteriorating effect by the specification of the specification signal, and/or if the requirement is within a predetermined value interval.

7. The method according to claim 1, wherein a reinforcement learning or an Exploration versus Exploitation algorithm is used as the training algorithm.

8. The method according to claim 1, wherein the model is initialized by way of an initial standard model that provides a same specification for driving maneuvers of different maneuver types.

9. The method according to claim 1, further comprising:

sending model data of the model to a server device external to the motor vehicle, wherein the model data describe a current mapping behavior of the model; and receiving combined model data from the server device, wherein the combined model data has been generated by the server device by combining the model data and further model data of at least one further motor vehicle; and updating the model by way of the combined model data.

10. A processor circuit in a motor vehicle, the processor circuit comprising:

a processor; and a memory storing program code that, when executed by the processor, causes the processor circuit to:

receive driving situation data that describe a driving situation in which a driving maneuver is executed;

provide the driving situation data to a model of machine learning as input variables;

generate, based on the model, a specification signal for at least one driver assistance system of a motor vehicle from the input variables, wherein the at least one driver assistance system controls at least one actuator that controls motorized steering, an engine, or a braking system of the motor vehicle, and wherein the specification signal specifies a specification to be adhered to during the driving maneuver;

receive consumption data of a consumption measurement that indicate an energy requirement and/or performance requirement and/or fuel requirement incurred, and/or an emission of at least one load when executing the driving maneuver;

map the consumption data on an evaluation signal by way of an evaluation function;

signal a training algorithm that trains the model by way of the evaluation signal, if, for the driving situation, the specification is to be retained or enhanced or avoided;

receive implementation data indicating that the specification has been rejected by the at least one driver assistance system; and signal a rejected specification to be avoided by way of the evaluation signal.

11. A motor vehicle comprising:

the processor circuit according to claim 10.

12. A system comprising:

the motor vehicle according to claim 11; and a server device that, in operation, communicates with the motor vehicle.

* * * * *